United States Patent
Emmrich

(10) Patent No.: US 7,331,630 B2
(45) Date of Patent: Feb. 19, 2008

(54) BEARING FOR A FOLDING BACKREST

(75) Inventor: Stefan Emmrich, Frankfurt am Main (DE)

(73) Assignee: Kochendorfer & Kiep Metallverarbeitung GmbH, Kriftel (DE)

( * ) Notice: Subject to any disclaimer, the term of this patent is extended or adjusted under 35 U.S.C. 154(b) by 286 days.

(21) Appl. No.: 11/121,907

(22) Filed: May 3, 2005

(65) Prior Publication Data

US 2005/0248201 A1 Nov. 10, 2005

(30) Foreign Application Priority Data

May 10, 2004 (DE) .................... 10 2004 023 510

(51) Int. Cl.
*B60N 2/20* (2006.01)
(52) U.S. Cl. .............................. 297/378.11
(58) Field of Classification Search ........... 297/378.11, 297/463.1
See application file for complete search history.

(56) References Cited

U.S. PATENT DOCUMENTS 4,103,967 A 8/1978 Tanaka et al.
4,219,234 A * 8/1980 Bell ........................... 297/374
6,409,263 B1 * 6/2002 Seibold .................. 297/216.13
6,659,559 B1 * 12/2003 Metzler et al. ......... 297/378.12

FOREIGN PATENT DOCUMENTS

DE 199 20 386 9/1980
DE 27 47 584 11/2000

* cited by examiner

*Primary Examiner*—Joe Edell
(74) *Attorney, Agent, or Firm*—Bachman & LaPointe, P.C.

(57) ABSTRACT

A folding backrest in a vehicle, comprises a bearing arm which is assigned to the backrest and is connected to a positionally fixed bearing block in an articulated manner, the bearing arm being assigned a locking element which, when the bearing arm is rotated rapidly about the joint, is guided by the bearing arm along a slotted guide toward a stop or into an end region of the slotted guide, but, upon slow rotation, allows the bearing arm to rotate freely, and the slotted guide has a recess which, when the bearing arm is rotated slowly, allows the locking element to get out of the way of the pivoting region of bearing arm.

5 Claims, 3 Drawing Sheets

BEARING FOR A FOLDING BACKREST

The invention relates to a bearing for a folding backrest in a vehicle, having a bearing arm which is assigned to the backrest and is connected to a positionally fixed bearing block in an articulated manner, the bearing arm being assigned a locking element which, when the bearing arm is rotated rapidly about the joint, is guided by the bearing arm along a slotted guide toward a stop or into an end region of the slotted guide, but, upon slow rotation, allows the bearing arm to rotate freely, and the slotted guide has a recess which, when the bearing arm is rotated slowly, allows the locking element to get out of the way of the pivoting region of said bearing arm, the locking element running with two spaced-apart sliding bodies in the slotted guide and a spacing between the two sliding bodies serving to temporarily accommodate one end of the bearing arm.

PRIOR ART

Vehicle backrests, in particular, are to be of folding design, if possible. This applies both to front seats and also to back seats. However, the present invention is not to be restricted solely to vehicle backrests, but rather applies to all backrests which are to be of folding design.

It is desirable for backrests of this type to be easily able to be folded over during normal handling. By contrast, they are to lock, for example in the case of an accident, so that they do not additionally fling or press the seated person forward.

U.S. Pat. No. 4,103,967 discloses a bearing for a folding backrest, in which the backrest is held in a locked position by a pin. This pin is guided in a slot. At a predetermined speed and also at a speed which is reduced up to a certain degree, the pin remains in a position in which the seat can be folded forward. Only if the reduction in speed exceeds a predetermined value does the pin pass into the locking position, so that the seat cannot then be moved forward.

It is known from DE 27 47 584 A1 that a bearing arm assigned to the backrest is connected to a positionally fixed bearing block in an articulated manner. Furthermore, the bearing arm is assigned a locking element which, when the bearing arm is rotated rapidly about the joint, moves against a stop, but, upon slow rotation, releases the bearing arm.

A bearing of the above mentioned type is disclosed in DE 199 20 386 A1.

OBJECT

The present invention is based on the object of improving this bearing known from DE 199 20 386 and, in particular, of minimizing the dead travel of the bearing arm involved for it to span the slotted-guide contours as far as the stop.

ACHIEVEMENT OF THE OBJECT

To achieve the object, a pin is provided on the locking element, said pin engaging in a recess in the bearing block, in which the pin moves in a radius about the sliding body remaining in the slotted guide and moves approximately parallel to the slotted guide.

In conjunction with the recess, this pin has the advantage that the sliding body which remains in the slotted guide is kept there. After minimal rotation of the bearing arm, the sliding body can enter the recess. As a result, the dead travel of the bearing arm is minimized.

The pin can move to a considerable extent in the recess. For this reason, the recess is designed to be substantially larger than the diameter of the pin and is preferably oval in shape. It runs somewhat obliquely to the slotted guide and accordingly forms a slope along which the pin can slide, as a result of which one sliding body is lifted out of the recess into which it has fallen during the slow turning over of the backrest. Furthermore, sufficient space remains for the pin to move approximately parallel to the slotted guide if a crash situation arises and the sliding body, which would drop into the recess during the slow turning over operation, remains in the slot.

The locking element itself may be designed as a stop plate; it merely has to be ensured that the two sliding bodies and the pin are arranged with respect to one another in a triangle.

So that the locking element remains in the unlocking position during the slow folding over of the backrest, a spring which presses onto the locking element on the other side of the stop is additionally provided.

BRIEF DESCRIPTION OF THE DRAWINGS

Further advantages, features and details of the invention emerge from the description below of preferred exemplary embodiments and with reference to the drawing, in which.

DETAILED DESCRIPTION

Figure 1:
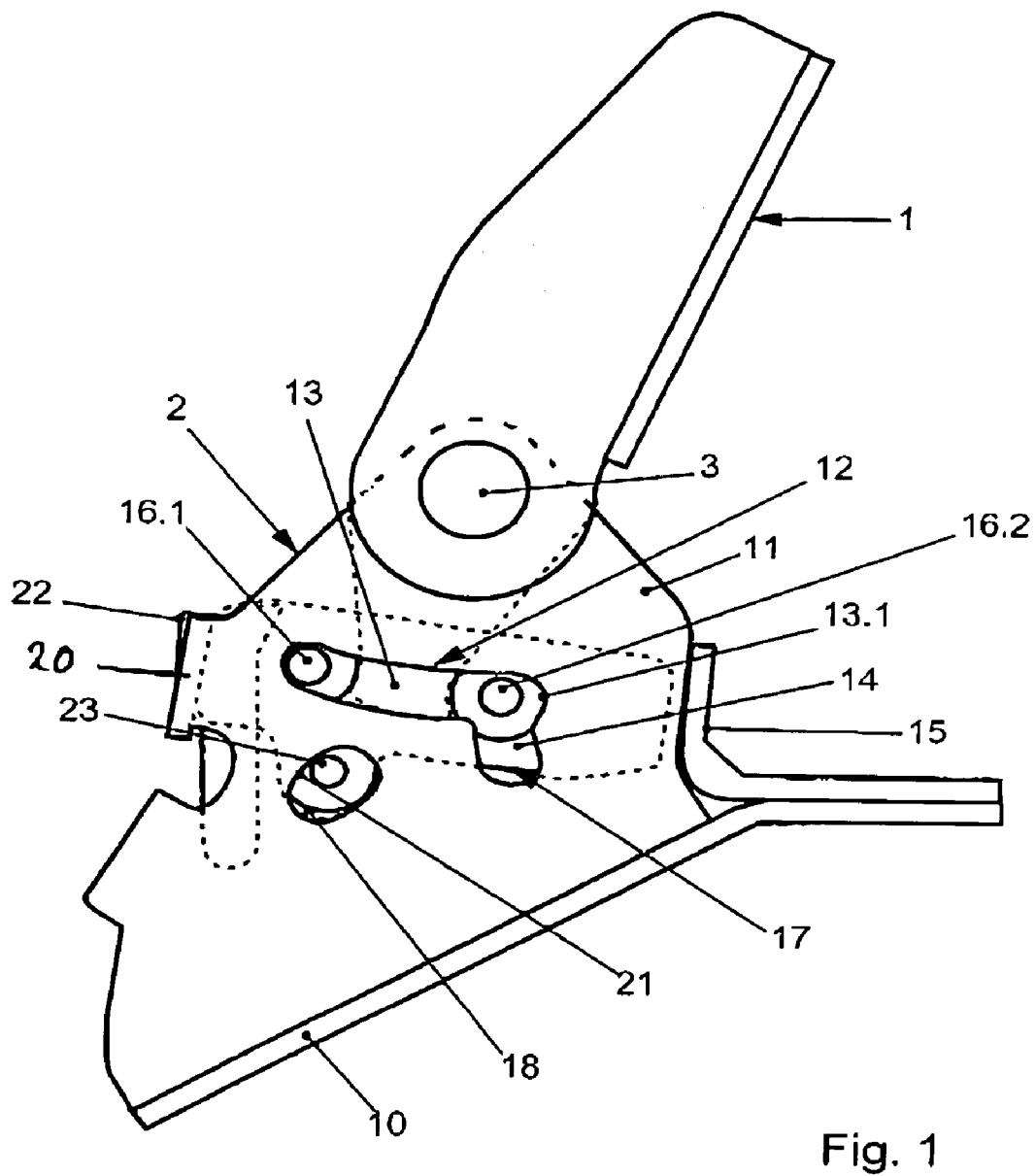
FIGS. 1 to 3 show different positions of use of the bearing according to the invention shown in FIG. 1.
Figure 2:
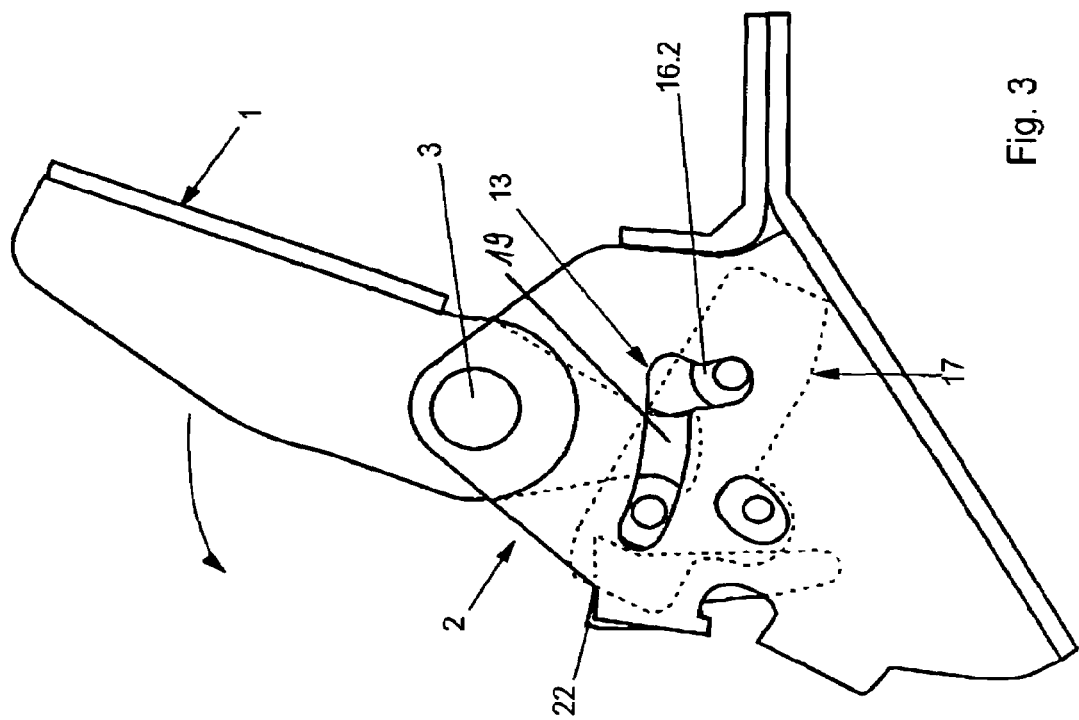
Figure 3:
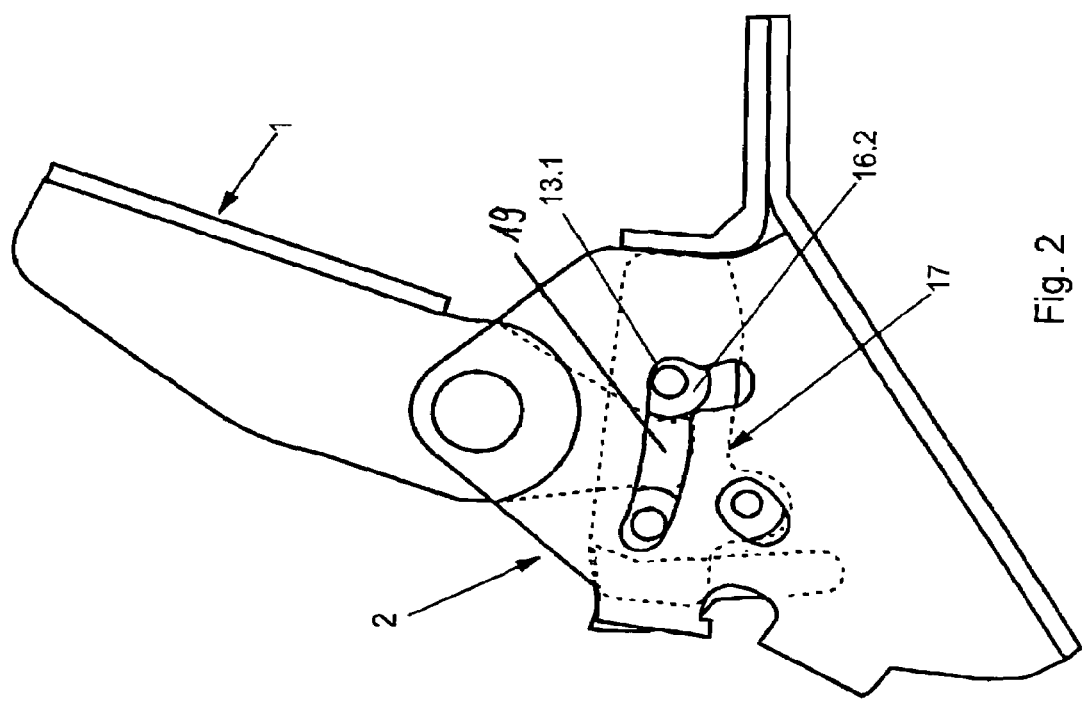

According to FIGS. 1 to 3, a bearing according to the invention for a folding backrest (not shown specifically) has a bearing arm 1. The bearing arm 1 is assigned a bearing block 2, with the connection taking place via a rotary joint 3.

The bearing block 2 is of angular design and has a base mount 10 for securing it, for example, to the chassis of a vehicle. Rising up from this base mount 10 is a supporting angle 11 which serves to secure the bearing arm 1.

A slotted guide 12 is formed in the supporting angle 11. The slotted guide 12 comprises a slot 13 which is curved horizontally or obliquely and from close to one end of which a lug-shaped recess 14 leads away downward approximately vertically. However, the slot 13 continues beyond the recess 14 with a hollow 13.1.

The slotted guide 12 is aligned with a stop 15 which, in the present exemplary embodiment, strikes against the supporting angle 11.

The slotted guide 12 is penetrated by two sliding bodies 16.1 and 16.2 which can slide in the slotted guide 12.

The sliding bodies 16.1 and 16.2 are connected to a locking element 17. They are arranged in a triangle on this locking element 17. The two sliding bodies 16.1 and 16.2 form two corners of the triangle and in the third corner a pin 23 sits in a recess 18 of the bearing block 2. This recess 18 is approximately oval in shape and is aligned obliquely with the slotted guide 12. The pin 23 can move in the recess 18, with it bearing against a slope 21 in the position of use shown in FIG. 1.

The manner in which the present invention operates is as follows:

In the starting position, the bearing arm is in a position, as illustrated in FIG. 1. A lug 19 of the bearing arm 1 is accommodated here between the two sliding bodies 16.1 and 16.2, with the sliding body 16.1 being situated away from the stop 15 at the end of the slot 13. In order also to limit a movement of the locking element 17 on the left side, a further stop 20 which is bent away from the bearing block 2 may be provided.

If the bearing arm 1 is now pivoted together with a backrest (not shown specifically) rapidly forward, as is the case, for example, in the event of a crash, then the sliding body 16.2, as it is guided in the slot 13, jumps over the recess 14 and enters the hollow 13.1 of the slot. This is illustrated in FIG. 2. The locking element 17 strikes against the stop 15, so that a further pivoting movement of the bearing arm 1 is impossible, since the lug 19 continues to be situated between the two sliding bodies 16.1 and 16.2.

Figure 4:
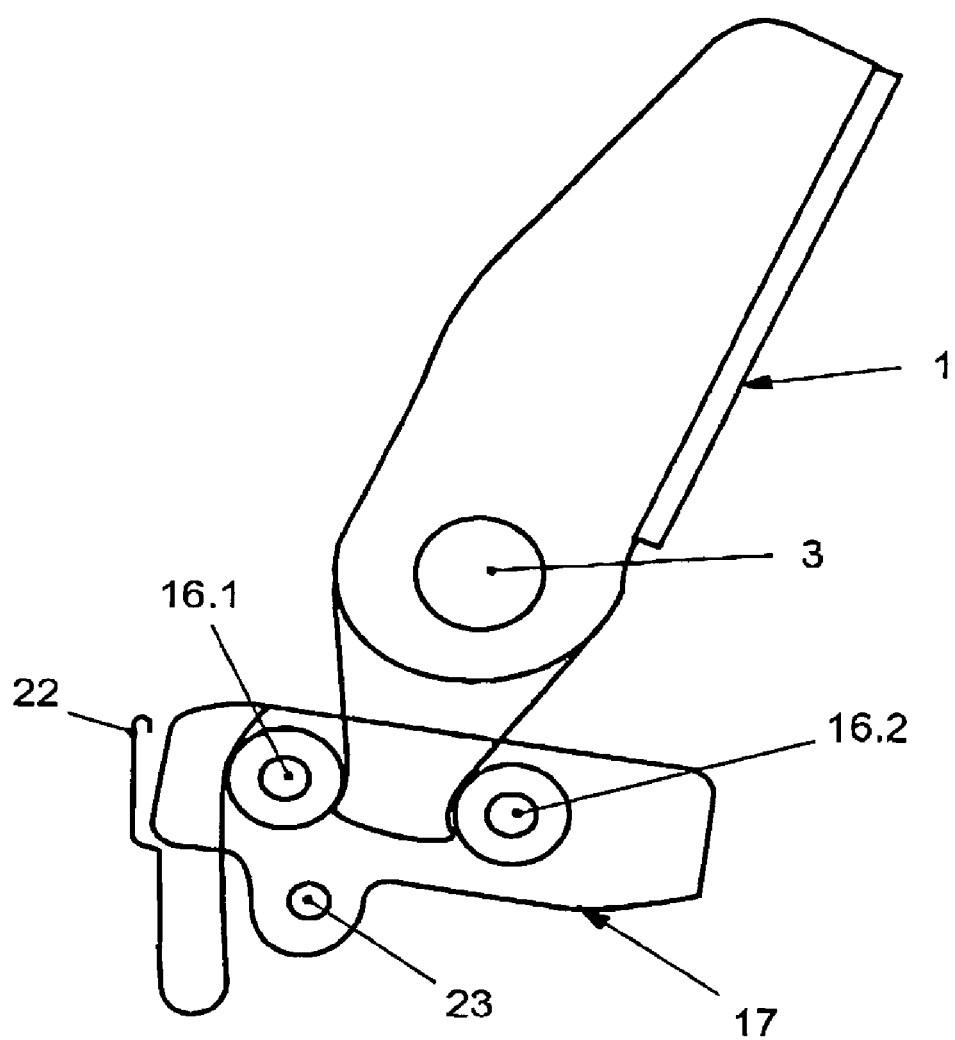
FIG. 4 shows the wire spring 22 which is substantially U-shaped.
Figure 5:
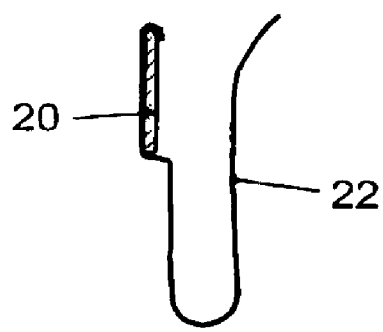
FIG. 5 illustrates the spring 22 held on the stop 20.

If, by contrast, a slow movement of the bearing arm 1 about the rotary joint 3 is carried out, then, as shown in FIG. 3, the sliding body 16.2 drops with the assistance of a substantially U-shaped wire spring 22 (see FIG. 4) into the recess 14, so that the lug 19 of the bearing arm 1 is released. This enables the bearing arm 1 and, together with it, the backrest to be folded completely forward while the spring 22 keeps the locking element in this end position. As seen in FIG. 5, the spring 22 is held on a stop 20. The stop 20 is formed on the backside of bearing block 2, see FIG. 1.

If the bearing arm 1 is set upright again, the lug 19 moves into the spacing between the two sliding bodies 16.1 and 16.2, and presses the sliding body 16.1 along the slot in the direction toward the stop 20. The pin 23 strikes against the slope 21 of the recess 18, so that the sliding body 16.2 is now lifted up. This sliding body 16.2 can slide out of the recess 14. The pin 23 keeps the sliding body 16.2 in its upper position. It prevents the sliding body 16.2 from entering the recess 14. The lug 19 is again held in a fixed manner between the two sliding bodies 16.1 and 16.2.

With this arrangement, a dead travel of the bearing arm 1 involved for it to span the slotted-guide contour as far as the stop is minimized.

The invention claimed is:

1. A bearing for a folding backrest in a vehicle, comprises a bearing arm connected in a rotatable manner to a fixed bearing block, the bearing arm includes a locking element which, when the bearing arm is rotated rapidly about a joint, is guided by the bearing arm along a slotted guide toward a stop or into an end region of the slotted guide, and, upon slow rotation, allows the bearing arm to rotate freely, and the slotted guide has a recess which, when the bearing arm is rotated slowly, allows the locking element to get out of the way of a pivoting region of said bearing arm, the locking element running with two spaced-apart sliding bodies in the slotted guide and a spacing between the two sliding bodies serving to temporarily accommodate one end of the bearing arm, wherein a pin is provided on the locking element, said pin engaging in a recess in the bearing block, wherein the pin moves in a radius about one of the two sliding bodies remaining in the slotted guide and moves approximately parallel to the slotted guide.

2. The bearing as claimed in claim 1, wherein the recess is approximately oval in shape.

3. The bearing as claimed in claim 2, wherein the recess runs obliquely to the slotted guide.

4. The bearing as claimed in claim 1, wherein the locking element includes a stop plate on which the sliding bodies and the pin are arranged in a triangle.

5. The bearing as claimed in claim 1, wherein a spring is pressed onto the locking element.

\* \* \* \* \*